US012678885B2

(12) United States Patent
Miyawaki et al.

(10) Patent No.: US 12,678,885 B2
(45) Date of Patent: Jul. 14, 2026

(54) BONDING DEVICE AND BONDING METHOD FOR FRICTION STIR BONDING AND RESISTANCE WELDING

(71) Applicant: HONDA MOTOR CO., LTD., Tokyo (JP)

(72) Inventors: Akiyoshi Miyawaki, Saitama (JP); Mitsuru Sayama, Saitama (JP); Taichi Kurihara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1011 days.

(21) Appl. No.: 17/861,776

(22) Filed: Jul. 11, 2022

(65) Prior Publication Data

US 2023/0014926 A1      Jan. 19, 2023

(30) Foreign Application Priority Data

Jul. 16, 2021      (JP) ................................. 2021-118229

(51) Int. Cl.
  B23K 11/11      (2006.01)
  B23K 20/12      (2006.01)
  B23K 103/18      (2006.01)

(52) U.S. Cl.
  CPC ............ B23K 11/11 (2013.01); B23K 20/125 (2013.01); B23K 20/1255 (2013.01); B23K 20/1265 (2013.01); *B23K 2103/18* (2018.08)

(58) Field of Classification Search
  CPC ..... B23K 11/11; B23K 11/115; B23K 20/125; B23K 20/1255; B23K 20/126; B23K 20/1265; B23K 20/128; B23K 20/22; B23K 2103/18; B23K 2103/20; B23K 2103/22; B23K 2103/24; B23K 20/227;
  (Continued)

(56) References Cited

U.S. PATENT DOCUMENTS

2001/0038028 A1* 11/2001 Iwashita ............ B23K 20/1265
                                                                    228/2.1
2004/0118899 A1* 6/2004 Aota ................... B23K 20/1255
                                                                    228/2.1
(Continued)

FOREIGN PATENT DOCUMENTS

CN      101850475 A      10/2010
JP      2005081375 A      3/2005
(Continued)

OTHER PUBLICATIONS

English translation to JP 2011083805A (Year: 2011).*
(Continued)

*Primary Examiner* — Ibrahime A Abraham
*Assistant Examiner* — Bonita Khlok
(74) *Attorney, Agent, or Firm* — Armstrong Teasdale LLP

(57)      ABSTRACT

A bonding device for joining together a first member (3), an intermediate member (4), and a second member (3) which are layered as a laminated assembly includes a probe (12, 41, 52), an anvil (11), a drive mechanism (14) configured to rotate the probe around the central axial line and move the probe toward and away from the second member along the central axial line, and an electric power supply (15) electrically connected to the anvil and the probe to conduct electric current through the laminated assembly via the anvil and the probe.

6 Claims, 5 Drawing Sheets

(58) Field of Classification Search
CPC .... B23K 20/2275; B23K 28/02; B23K 11/20;
B23K 20/12; B23K 20/122–126; B23K
20/127–128; B23K 35/00–007
USPC ....... 228/112.1, 114.5; 219/86.1, 118, 78.01,
219/91.2–91.23, 56–57, 156–161
See application file for complete search history.

(56) References Cited

U.S. PATENT DOCUMENTS

| | | | |
|---|---|---|---|
| 2008/0029581 A1* | 2/2008 | Kumagai | ........... B23K 20/1255 |
| | | | 228/101 |
| 2009/0090700 A1 | 4/2009 | Sato et al. | |
| 2016/0200074 A1 | 7/2016 | Lang et al. | |
| 2018/0311756 A1* | 11/2018 | Murayama | ......... B23K 11/3009 |
| 2022/0226928 A1* | 7/2022 | Ouchi | ................ B23K 20/1255 |

FOREIGN PATENT DOCUMENTS

| | | | | |
|---|---|---|---|---|
| JP | 2005111489 A | | 4/2005 |
| JP | 2007237253 A | | 9/2007 |
| JP | 2011083805 A | * | 4/2011 |

OTHER PUBLICATIONS

Notice of Reasons for Refusal for Japanese Patent Application No.
2021-118229 dated Aug. 20, 2024; 6 pp.
First Office Action for Chinese Patent Application No. 202210824441.8
dated Feb. 13, 2026; 16 pp.

* cited by examiner

Fig.1

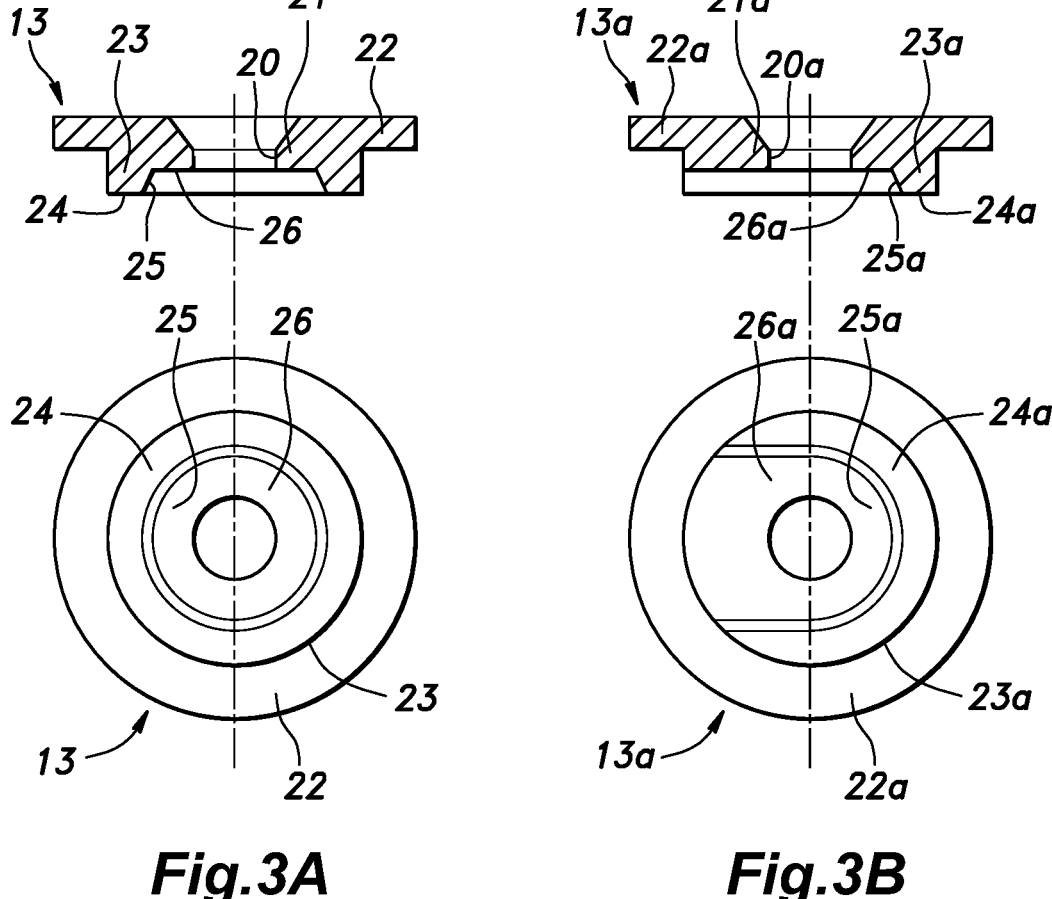
Fig.3A          Fig.3B

*Fig.5*

BONDING DEVICE AND BONDING METHOD FOR FRICTION STIR BONDING AND RESISTANCE WELDING

TECHNICAL FIELD

The present invention relates to a bonding device and a bonding method for friction stir bonding and resistance welding.

BACKGROUND ART

Resistance welding and friction stir bonding are known as environmentally friendly processes for joining a plurality of metallic plate members as these processes emit relatively small amounts of gases, and cause very little impact on air quality. In particular, friction stir bonding is preferred as this process requires a relatively small amount of electric power.

When joining three or more metallic plate members made of dissimilar material by resistance welding, an adhesive agent is often used in combination for the purpose of preventing electrolytic corrosion. However, it is difficult to prevent flaws which are intrinsic to the adhesive agent, and a stable bonding strength may not be maintained for a prolonged period of time without highly stringent precautionary measures. When a high level of reliability is required, rivets may have to be used in combination.

Friction stir bonding is suited for joining two metallic plate members made of dissimilar materials, but may not be suited for joining three or more metallic plate members because of a limited range of the material that is effectively stirred. For instance, when an aluminum plate member and a pair of steel plate members are to be joined by friction stir bonding, the upper two of the members (such as an aluminum plate member and a steel plate member) may be properly joined, but the third member or the lowermost layer may not be properly joined to the other two.

JP2005-111489A discloses a method for joining three or more metallic members including those made of dissimilar materials by combining two bonding techniques. According to this prior art, an aluminum member, a steel member and a clad member containing an aluminum layer and a steel layer are joined to one another by joining the aluminum member to the aluminum layer of the clad member by friction stir bonding, and joining the steel member and the steel layer of the clad member at the same time by using a thermosetting adhesive agent which is cured by the frictional heat of the friction stir bonding. However, this method requires the presence of a clad member in one of the members that are to be joined.

In the process disclosed in JP2007-237253A, a pair of members are abutted against each other, and joined to each other by friction stir bonding, and a third member is joined to the bonded part by using a fusion welding or resistance welding.

When three or more metallic members including those made of dissimilar materials, it is necessary to combine two or more different joining methods. According to the prior art, the entire joining process has to be performed in multiple steps, and two or more different joining devices have to be used with the result that the production line has to be extended, and a substantial amount of investment is required.

In view of such problems of the prior art, a primary object of the present invention is to provide a bonding device and a bonding method for joining three or more members including those made of dissimilar materials which allow the time required for the bonding process to be reduced, and the expenditure for the production facility to be reduced. The present invention may contribute to minimization of environmental impact on the air, and improvement in energy efficiency of the production facility.

SUMMARY OF THE INVENTION

To achieve such an object, one aspect of the present invention provides a bonding device (1, 51) for joining together a first member (3), an intermediate member (4), and a second member (5) which are electroconductive, extend along a prescribed major plane, and are layered in this order as a laminated assembly (2), comprising: an anvil (11) configured to support a first surface of the laminated assembly provided by the first member, and including an electroconductive part abutting against the first surface; a probe (12, 41, 52) configured to rotate around a central axial line crossing the major plane and move toward and away from a second surface (7) of the laminated assembly provided by the second member at a position corresponding to the anvil, the probe being at least partly electroconductive; a drive mechanism (14, 54) configured to rotate the probe around the central axial line and move the probe toward and away from the second member along the central axial line; an electric power supply (15) electrically connected to the anvil and the probe to conduct electric current through the laminated assembly via the anvil and the probe; and a control unit (16) for controlling operation of the drive mechanism and the electric power supply such that the first member and the intermediate member are joined to each other by resistance welding and the second member and the intermediate member are joined to each other by friction stir bonding.

According to this aspect of the present invention, since the anvil and the probe used for friction stir bonding additionally serve as electrodes for resistance welding, the equipment cost can be reduced, the equipment size can be reduced, and the length of the production line can be reduced. Further, since friction stir bonding and resistance welding can be performed at the same time, the processing time can be reduced.

Preferably, the bonding device further comprises a shoulder member (13, 13a, 44) having a shoulder contact surface (24, 24a) configured to be pressed against the second surface (7), a thorough hole (20, 20a) configured to receive the probe, and a recess (25, 25a) recessed relative to the shoulder contact surface so as to define a bottom surface (26, 26a) opposing the second surface and partly receive the probe.

Since a hook projecting into the second member is formed in the intermediate member by friction stir bonding, the bonding strength is increased.

Preferably, the shoulder member (13) is at least partly electroconductive, and the probe (41) is provided with a probe conductive part (42) extending from a part electrically connected to the power supply (15) to a tip end of the probe opposing the second surface, and a probe insulating part (43) provided on an outer periphery of the probe so as to electrically insulate the probe conductive part (42) from an inner circumferential surface of the through hole.

The probe insulating part prevents electric current from flowing from the probe to the shoulder member so that the second member is prevented from melting. As a result, the bonding quality can be stabilized and improved, and electric safety of the production equipment can be improved.

Preferably, the shoulder member (44) is partly electro-conductive, and is provided with a shoulder member insulating part (46) extending over the shoulder contact surface (24) and an inner peripheral surface of the through hole (20).

The shoulder member insulating part prevents electric current from flowing from the probe to the shoulder member so that the second member is prevented from melting. As a result, the bonding quality can be stabilized and improved, and electric safety of the production equipment can be improved.

Preferably, the friction stir welding is a friction stir spot welding, and the shoulder contact surface (24) has an annular shape centered around the probe (12, 41).

Thereby, the external appearance of the welded part is improved owing to the annular shoulder contact surface.

Preferably, the friction stir welding is a friction stir line welding, and the recess (25a) is open in a rear side thereof with respect to a traveling direction of the probe (12, 41) along a welding line.

The stirred material of the second member is allowed to pass through the open rear side of the recess so that the probe along with the shoulder member can be moved relative to the laminated assembly along the welding line without encountering an excessive resistance.

Another aspect of the present invention provides a bonding method for joining together a first member (3), an intermediate member (4), and a second member (3) which are electroconductive, extend along a prescribed major plane, and are layered in this order as a laminated assembly (2) by using the bonding device as defined above, comprising the steps of: abutting the anvil (11) against the first surface (6) of the laminated assembly (2); pushing the probe into the laminated assembly from the second surface while rotating the probe around the central axial line by using the drive mechanism to join the second member and the intermediate member to each other by friction stir bonding; as soon as a tip end of the probe reaches the intermediate member, conducting electric current between the probe and the anvil by using the electric power supply to join the first member and the intermediate member to each other by resistance welding; and pulling the probe away from the laminated assembly.

According to this aspect of the present invention, since the anvil and probe used for friction stir bonding additionally serve as electrodes for resistance welding, the equipment cost can be reduced, the equipment size can be reduced, and the length of the production line can be reduced. Further, since friction stir bonding and resistance welding can be performed at the same time, the processing time can be reduced.

When dissimilar materials are resistance welded, highly brittle intermetallic compounds are often generated so that the desired bonding strength may not be achieved. However, according to this aspect of the present invention, the second member and the intermediate member are joined by friction stir bonding instead of resistance welding so that the bonding strength is prevented from being reduced by such intermetallic compounds.

Typically, materials of the first member and the intermediate member are higher in mechanical strength and electric resistance than the material of the second member. Members being made of similar materials as used herein mean that they are alloys whose main components are the same, and the members being made of dissimilar materials as used herein means that they are alloys whose main components are different.

Preferably, the step of pulling the probe away from the laminated assembly is performed while the probe is kept being rotated around the central axial line.

Since the frictional heat generated by the rotation of the probe contributes to the heat for performing the resistance welding, the energy consumption for the resistance welding can be reduced, and the rapid cooling of the thermally melted material is avoided so that the nugget is enabled to maintain a high level of toughness.

The present invention thus provides a bonding device and a bonding method for joining three or more members including those made of dissimilar materials which allow the time required for the bonding process to be reduced, and the expenditure for the production facility to be reduced.

BRIEF DESCRIPTION OF THE DRAWING(S)

FIG. 1 is a vertical sectional view showing a bonding device according to a preferred embodiment of the present invention:

FIG. 3A shows the shoulder member of the bonding device illustrated in FIG. 1 in sectional view and plan view;

FIG. 3B show a modified shoulder member illustrated similarly as in FIG. 3A;

FIG. 5 is a view similar to FIG. 1 showing a bonding device according to another embodiment of the present invention.

DESCRIPTION OF THE PREFERRED EMBODIMENT(S)

Figure 1:
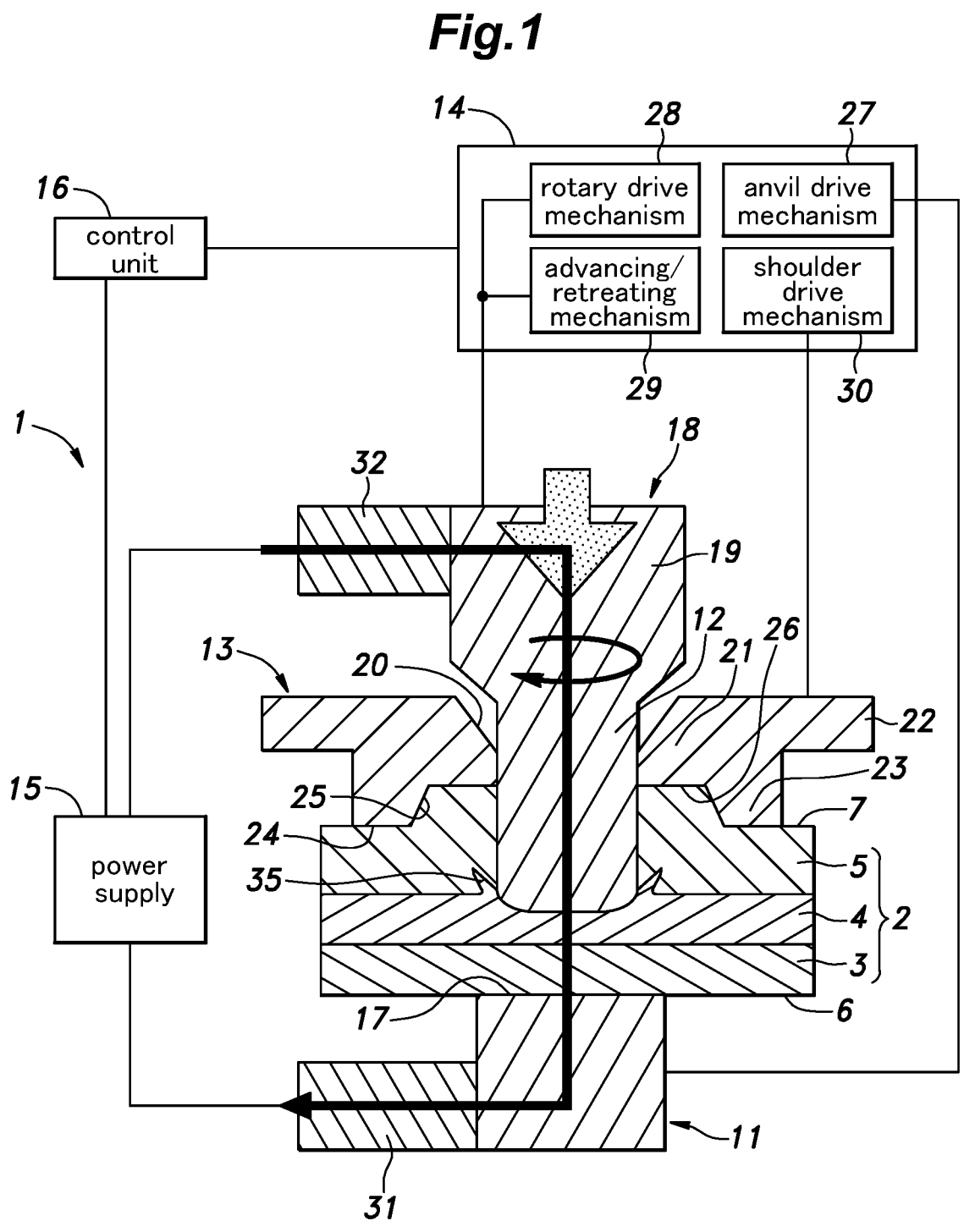
Figure 2A:
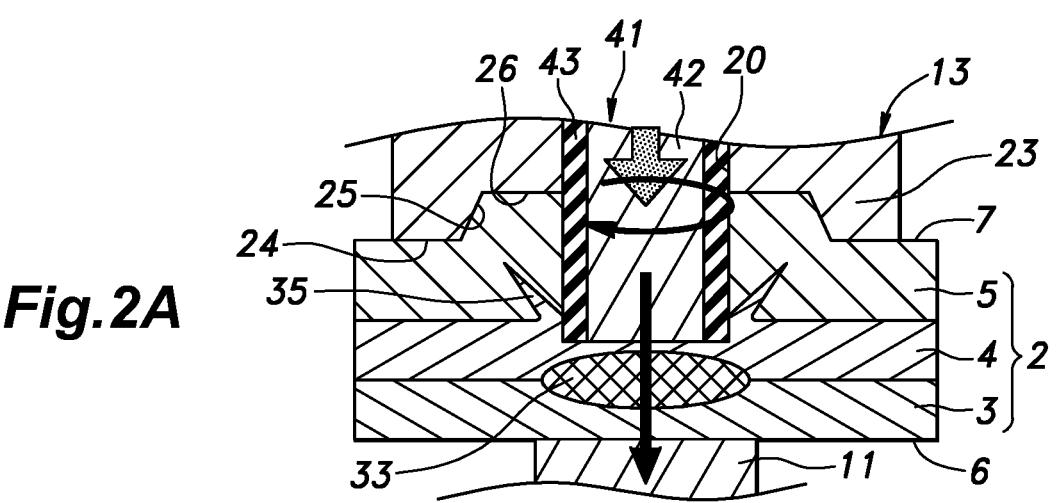
FIGS. 2A to 2C show different examples of electrical insulation in the bonding device.

A preferred embodiment of the present invention will be described in the following with reference to the appended drawings. FIG. 1 is a vertical sectional view of a bonding device 1 according to a preferred embodiment of the present invention along with a laminated assembly 2 which is processed by the bonding device 1. In the following description, the laminated assembly 2 extends along a horizontal plane (major plane), and the bonding device 1 is applied downward to this laminated assembly 2 in the vertical direction, but this orientation is only exemplary, and the present invention may be applied to a workpiece oriented in any desired direction and from any desired direction, such as laterally, upwardly and obliquely without departing from the purview of the present invention.

The laminated assembly 2 includes a first member 3, an intermediate member 4, and a second member 5 which all consist of electroconductive plate members, and are layered in this order on a horizontal major plane. The laminated assembly 2 has a first surface 6 provided by the lower surface of the first member 3 (the lowermost layer) and a second surface 7 provided by the upper surface of the second member 5 (the uppermost layer). In an alternate embodiment, the laminated assembly 2 further includes an additional member on the lower side of the first member 3 which is made of the same or a similar material as the first member 3.

In this embodiment, the first member 3 and the intermediate member 4 are made of a same material or similar materials while the second member 5 is made of a different or dissimilar material from the first member 3 and the intermediate member 4. The material of the first member 3 and the intermediate member 4 has a higher strength and higher electrical resistance than the material of the second member 5. For example, the first member 3 and the intermediate member 4 may consist of an iron alloy (steel) while the second member 5 consists an aluminum alloy, a magnesium alloy, or a copper alloy. Alternatively, the first member 3 and the intermediate member 4 may consist of a titanium alloy while the second member 5 consists an aluminum alloy, a magnesium alloy, or a copper alloy. Further, the first member 3 and the intermediate member 4 may consist of an aluminum alloy while the second member 5 consists a copper alloy.

The bonding device 1 includes an anvil 11 configured to support the first surface 6 of the laminated assembly 2, a probe 12 positioned above the anvil 11, an annular shoulder member 13 positioned above the anvil 11 and surrounding the probe 12, a drive mechanism 14 for driving the anvil 11, the probe 12, and the shoulder member 13 as will be described hereinafter, a power supply 15 for conducting electric current between the probe 12 and the anvil 11 that interpose the laminated assembly 2 therebetween, and a control unit 16 that controls the operation of the drive mechanism 14 and the power supply 15.

The anvil 11 is made of an electroconductive material, and has an anvil contact surface 17 that abuts on the first surface 6 of the laminated assembly 2.

The probe 12 is provided in a free end (lower end) part of a rotatable member 18 which is rotatable around a central axial line and has a rotationally symmetric shape around the central axial line. The probe 12 extends along the central axial line and preferably has a cylindrical shape which has a smaller diameter than a base end part 19 of the rotatable member 18. The probe 12 is made of a hard material such as steel, ceramic, cemented carbide, or the like.

As shown in FIG. 1, the shoulder member 13 has a rotationally symmetric shape around the central axial line. The shoulder member 13 has a probe support portion 21 having a through hole 20 centered on the central axial line, a flange 22 extending radially outward from the probe support portion 21, and an annular side wall portion 23 projecting downward from the lower surface of the probe support portion 21 concentrically to the central axial line. The probe 12 is passed through the through hole 20. The upper end of the through hole 20 is formed as a countersink in a conical shape. The inner diameter of the lower part (main part) of the through hole 20 is slightly larger than the outer diameter of the probe 12, and when the probe 12 rotates around the central axial line, the inner peripheral surface of the through hole 20 may be in sliding contact with the outer peripheral surface of the probe 12. The inner diameter of the side wall portion 23 is substantially larger than the outer diameter of the probe 12 so that the inner peripheral surface of the side wall portion 23 is concentrically separated from the outer peripheral surface of the probe 12. The inner peripheral surface of the side wall portion 23 may be flared toward the lower end thereof in a conical shape, but may also be substantially parallel to the axial direction. The lower surface of the side wall portion 23 forms a shoulder contact surface 24 that may abut on the second surface 7 of the laminated assembly 2. Thus, a recess 25 is defined by the lower surface of the probe support portion 21 opposing the second surface 7 of the laminated assembly 2, and the inner peripheral surface of the side wall portion 23, and the recess 25 is recessed relative to the shoulder contact surface 24. The shoulder member 13 may be made of a hard material such as a copper alloy (chromium copper, alumina-dispersed copper, tungsten copper alloy, etc.), a conductive ceramic, a cemented carbide, or the like.

As shown in FIG. 1, the drive mechanism 14 includes an anvil drive mechanism 27 for vertically moving the anvil 11, a rotary drive mechanism 28 for rotating the rotatable member 18 that includes the probe 12 around the central axial line, an advance/retreat drive mechanism 29 for advancing/retreating the probe 12 along the central axial line, and a shoulder drive mechanism 30 for vertically moving the shoulder member 13.

The power supply 15 is electrically connected to a first terminal 31 and a second terminal 32. The first terminal 31 is electrically connected to the anvil 11, and the second terminal 32 is electrically connected to the rotatable member 18 (each via a sliding contact mechanism or a flexible cable). The anvil 11 is at least partly electrically conductive so that electric current can be supplied to the anvil contact surface 17 via the first terminal 31, and the rotatable member 18 is at least partly electrically conductive so that electric current can be supplied to the tip end of the probe 12 via the second terminal 32.

The mode of operation of the bonding device 1 illustrated in FIG. 1 in processing the laminated assembly 2 will be described in the following with reference to FIGS. 4A to 4E.

Figures 4A, 4B, 4C, 4D, 4E:
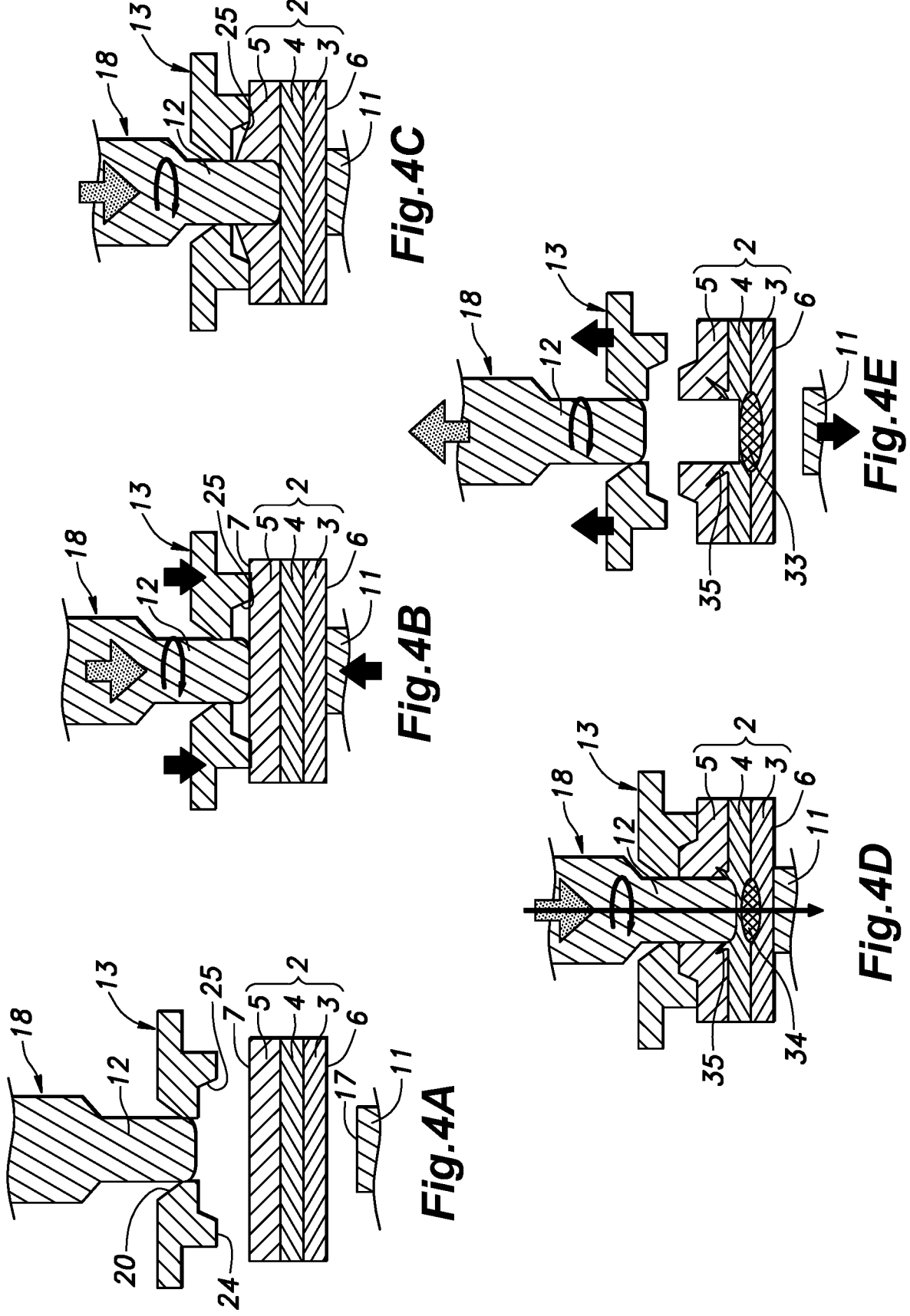
FIGS. 4A to 4E are diagrams illustrating different stages of a bonding method according to a preferred embodiment of the present invention.

As shown in FIG. 4A, the first member 3, the intermediate member 4, and the second member 5 are placed on the anvil 11, and the probe 12 and the shoulder member 13 are positioned above the second surface 7. The probe 12 and the shoulder member 13 are moved downward so as to press the laminated assembly 2 against the anvil 11 by using the drive mechanism 14 under the control of the control unit 16 in preparation for the friction stirring spot bonding and the resistance spot welding to be performed as will be described in the following.

As shown in FIG. 4B, the anvil 11 presses the first surface 6 of the laminated assembly 2 from below, and the shoulder member 13 presses the second surface 7 of the laminated assembly 2 from above. While the laminated assembly 2 is pressed between the anvil 11 and the shoulder member 13, the probe 12 is rotated around the central axial line, and advanced into the laminated assembly 2 from the side of the second surface 7.

As shown in FIG. 4C, the tip of the probe 12 is plunged into the second member 5, and this causes the second member 5 to be deformed such that the material of the second member 5 pushed away therefrom is displaced into the recess 25 of the shoulder member 13. Owing to the frictional heat generated by the rotating probe 12, the material of the second member 5 surrounding the probe 12 becomes plastically fluid, and an annular plastically fluid region is generated around the probe 12. Once the tip of the probe 12 reaches the intermediate member 4, the control unit 16 causes electric current to flow between the probe 12 and the anvil 11. The position of the tip of the probe 12 can be detected or managed by the downward stroke of the probe 12, the plunging pressure (plunging load) of the probe 12 into the laminated assembly 2, the rotational load of the probe 12, or any combination of the above.

As shown in FIG. 4D, with electric current flowing between the probe 12 and the anvil 11, the probe 12 is kept rotating and moved further downward, and the tip of the probe 12 plunges into the intermediate member 4. As a result, the resistance heat generated in the first member 3 and the intermediate member 4 and the frictional heat generated by the rotation of the probe 12 cause a molten region 34 to be generated in or between the first member 3 and the intermediate member 4. At the same time, a part of the material of the second member 5 and the intermediate member 4 in the vicinity of the probe 12 is caused to plastically flow. In particular, the part of the material that is pushed further away from the probe 12 is cooled and becomes comparatively less fluid, but is pushed away from the probe 12 under pressure from the more fluid part of the material. As a result, a hook 35 that projects radially outward and upward is created in the part of the intermediate member 4 surrounding the probe 12. The hook 35 thus has a crown shape flaring toward the front end (upper end) thereof, and obliquely extends into or wedge into the material of the second member 5.

As shown in FIG. 4E, the control unit 16 (see FIG. 1) stops supplying the electric current between the probe 12 and the anvil 11, and causes the probe 12 to retreat along the axial line while rotating. Further, the anvil 11 and the shoulder member 13 are moved away from the laminated assembly 2. When the current is stopped and the probe 12 is moved away, the molten region 34 (see FIG. 4D) solidifies to form a nugget 33 which firmly joins the first member 3 and the intermediate member 4 to each other. Further, since the hook 35 is formed in the second member 5 and the intermediate member 4 that have been plastically flowed by the rotation of the probe 12, the second member 5 and the intermediate member 4 are also firmly joined to each other.

Figure 2B:
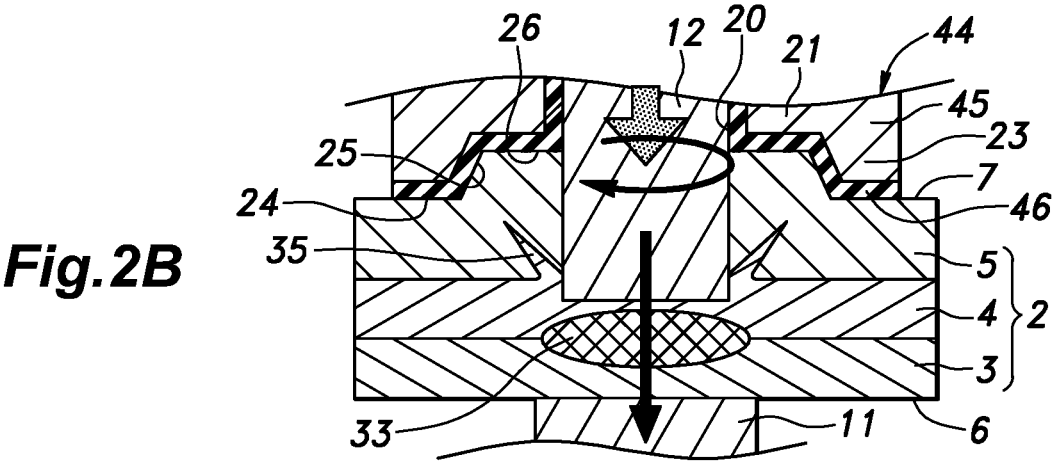
Figure 2C:
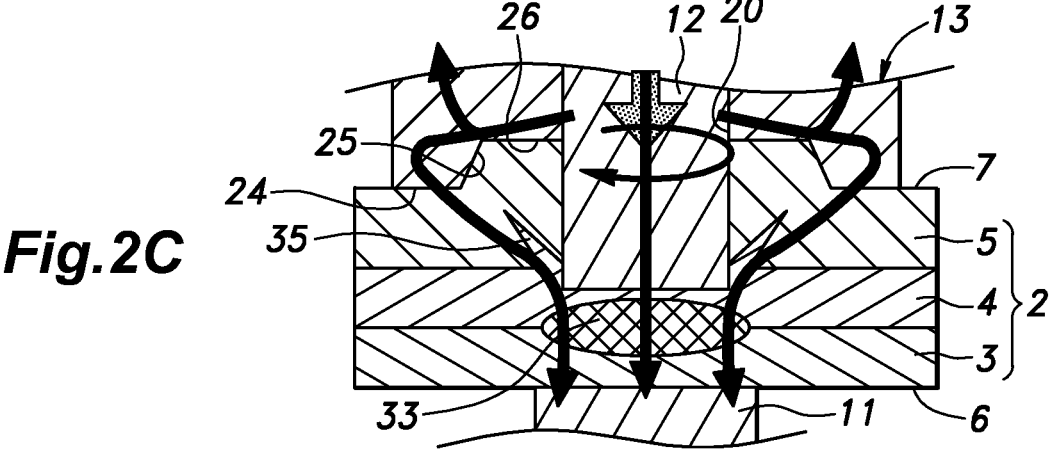

FIG. 2C shows the distribution of the electric current which is supplied to the probe 12 by the electric power supply 15, and flows to the anvil 11 via the laminated assembly 2 when the tip end of the probe 12 is pushed into the laminated assembly 2 from the second surface 7. The shaded (gray) arrow indicates the downward movement of the probe 12, and the thin arrow indicates the rotation of the probe 12. The bold arrows indicate the flow of electric current. Owing to this electric current, the nugget 33 is formed between the first member 3 and the intermediate member 4 so that the first member 3 and the intermediate member 4 are joined to each other. However, a part of the electric current is conducted through the shoulder member 13, instead of being concentrated in the intermediate member 4 and the first member 3, so that the energy efficiency in performing the resistance welding is reduced. It is therefore desirable to eliminate or reduce the part of the electric current that flows through the shoulder member 13 by using the arrangements illustrated in FIGS. 2A and 2B. In the following description of these examples, the parts corresponding those in FIG. 2C are denoted with like numerals without necessarily repeating the description of such parts to avoid redundancy.

In the example shown in FIG. 2A, the probe 41 includes a probe conductive part 42 having a cylindrical shape and coaxially extending along the central axial line, and a probe insulating part 43 provided on the outer circumferential surface of the probe conductive part 42. The lower end surface of the probe conductive part 42 is not covered by the probe insulating part 43, and exposed. Therefore, when the probe 41 is received in the through hole 20 of the shoulder member 13, only the probe insulating part 43 is in sliding contact with the inner circumferential surface of the through hole 20 of the shoulder member 13. The probe insulating part 43 prevents electric current from flowing from the probe 41 to the shoulder member 13. An additional layer (not shown in the drawings) (which may be either electroconductive or electrically insulating) may be formed on the outer circumferential surface of the probe insulating part 43 for the purpose of improving the wear resistance of the probe 41. Additionally or alternatively, an insulating layer may be formed on the inner circumferential surface of the through hole 20 of the shoulder member 13.

In the example shown in FIG. 2B, the shoulder member 13 is provided with a main body 45 which is essentially identical to the shoulder member 13 shown in FIG. 1, and a shoulder member insulating layer 46 extending over the inner circumferential surface of the through hole 20, the lower surface and inner circumferential surface of the annular side wall portion 23 and the bottom surface 26 of the recess 25. The shoulder member insulating layer 46 prevents electric current from flowing from the probe 41 to the shoulder member 13.

In the examples shown in FIGS. 2A and 2B, the probe conductive part 42 and the main body 45 may be made of a copper alloy (such as chromium copper, alumina-dispersed copper, tungsten copper alloy, etc.), electroconductive ceramic material, cemented carbide, or the like. The probe insulating part 43 and the shoulder member insulating layer 46 may be made of insulating ceramic material, Bakelite (registered trademark) (phenol resin), mica, or the like.

The friction stir bonding performed by the above-mentioned bonding device 1 is a friction stir spot bonding, and the shoulder contact surface 24 of the shoulder member 13 contributes to a favorable external appearance of the bonded spot. FIG. 3A shows the shoulder member 13 of the bonding device 1 shown in FIG. 1 in greater detail.

FIG. 3B shows an alternate embodiment of the shoulder member 13a. In FIG. 3B, the parts corresponding to those in FIG. 4A are denoted with like numerals each followed by letter "a". In this case, the side wall portion 23a is U shaped so that the recess 25a has an opening on one side defined by a pair of mutually parallel linear sections of the side wall portion 23a on the rear side of the shoulder member 13a with respect to the traveling direction of the shoulder member 13a relative to the laminated assembly 2 at the time of a line bonding. According to this embodiment, the laminated assembly 2 may be bonded along a line in a favorable manner by moving the laminated assembly 2 along a horizontal line relative to the bonding device 1 by using the bonding device 1 fitted with the shoulder member 13 shown in FIG. 3B. Even though the shoulder member 13 shown in FIG. 4A may be used for performing friction stir bonding along a line, but the embodiment shown in FIG. 4B is advantageous since the open side of the recess 25a allows the laminated assembly 2 to be moved relative to the bonding device 1 with a relatively small resistance. The side wall portion 23a may also consist of a pair of mutually parallel sections extending along the relative movement between the laminated assembly 2 and the bonding device 1.

Various features and advantages of the foregoing embodiments will be discussed in the following.

In the bonding device 1 described above, the anvil 11 and the probe 12 for friction stir bonding can serve as the electrodes for resistance spot welding, the cost and the size of the bonding device 1 can be minimized as compared to the case where a friction stir bonding device and a resistance spot welding device are individually employed. In particular, by using the bonding device 1 described above, the length of the manufacturing line can be reduced, and the amount of necessary investment can be reduced. Further, since friction stir bonding and resistance spot welding can be performed simultaneously, the time required for the manufacturing process can be reduced.

When dissimilar materials are resistance welded, highly brittle intermetallic compounds are often generated so that the desired bonding strength may not be achieved. In the foregoing embodiments, since the second member 5 and the intermediate member 4, which may be dissimilar materials, are joined by friction stir bonding instead of resistance welding, the bonding strength is prevented from being reduced by such intermetallic compounds.

In the foregoing embodiments, the friction heat created by the probe 12 in friction stir bonding the intermediate member 4 and the second member 5 contributes to the resistance welding of the intermediate member 4 and the first member 3, the energy consumption for the resistance welding can be reduced.

In resistance welding, it is known that the toughness of the nugget 33 may be reduced if the molten region 34 is too rapidly cooled. In the foregoing embodiments, since the probe 12 is kept rotating, and pulled out from the laminated assembly 2 after the supply of electric current for resistance welding is stopped, the frictional heat generated by the probe 12 is conducted to the molten region 34 so that the molten region 34 is prevented from being rapidly cooled, and the nugget 33 is prevented from being reduced in toughness.

In the examples shown in FIGS. 2A and 2B, owing to the presence of the probe insulating part 43 and the shoulder member insulating layer 46, electric current is entirely or significantly prevented from flowing through the shoulder member 13, and very little part of the electric current flows through the second member 5 so that the melting of the second member 5 can be avoided. As a result, the bonding quality can be stabilized and improved, and the electrical safety of the equipment can be enhanced.

Figure 5:
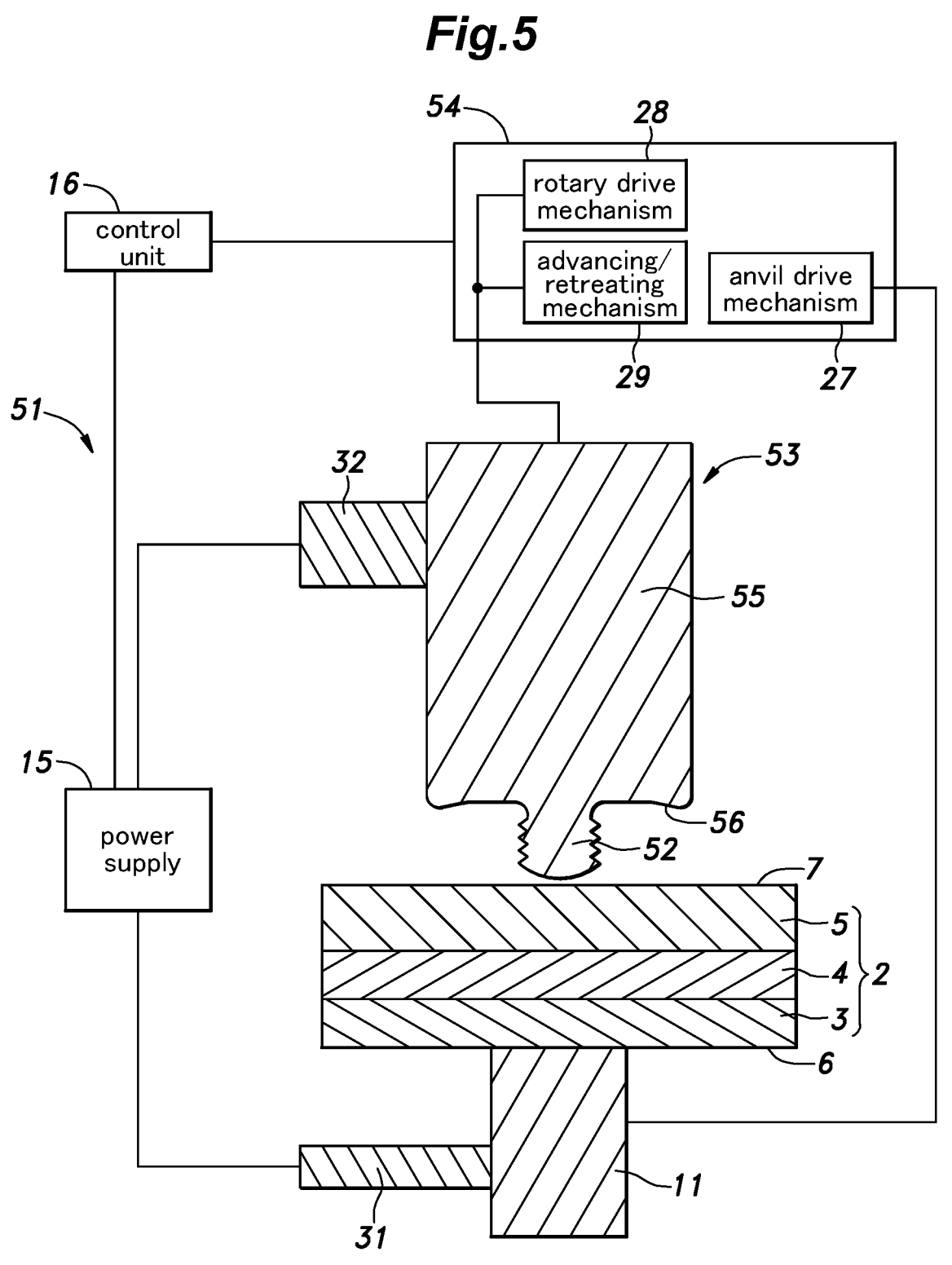

FIG. 5 shows the bonding device 51 according to a second embodiment of the present invention. The parts corresponding to those of the first embodiment are denoted with like numerals without necessarily repeating the description of such parts. The bonding device 51 of the second embodiment includes an anvil 11, a rotatable member 53 including a probe 52, a drive mechanism 54, an electric power supply 15, and a control unit 16 for controlling the operation of the drive mechanism 54 and the power supply 15. The drive mechanism 54 includes a rotary drive mechanism 28 and an advance/retreat drive mechanism 29, and an anvil drive mechanism 27.

The rotatable member 53 is rotatable about the central axial line as a whole. The rotatable member 53 includes a base end part 55 having a substantially cylindrical shape centered around the central axial line, and a probe 52 extending downward from the lower surface of the base end part 55. The rotatable member 53 is substantially entirely electroconductive. The probe 52 has a substantially cylindrical shape coaxial with the base end part 55, and is reduced in diameter as compared to the base end part 55. The probe 52 is preferably provided with a screw thread or any other irregular surface feature on the outer periphery thereof. In this case, the shoulder member is absent.

A downwardly facing annular shoulder surface 56 is defined at the boundary between the base end part 55 and the probe 52 of the rotatable member 53. The shoulder surface 56 may have convex contour such that the radially inner part is vertically recessed as compared to the radially outer part. The probe 52 may be made of a hard material such as a copper alloy (chromium copper, alumina-dispersed copper, tungsten copper alloy, etc.), a conductive ceramic, a cemented carbide, or the like.

The mode of operation of the bonding device 51 of the second embodiment is similar to that of the first embodiment except for the absence of the shoulder member 13. The annular shoulder surface 56 provides a recess into which the plastically flowed material of the second member 5 is displaced, similarly as the recess 25 of the shoulder member 13 of the first embodiment (see FIG. 1).

The present invention has been described in terms of specific embodiments, but is not limited by such embodiments, and can be modified in various ways without departing from the scope of the present invention. For instance, the bonding between the second member and the intermediate member may be performed by resistance welding other than the resistance spot welding. Also, various features of different embodiments can be combined in different ways from those given in the foregoing embodiments. For instance, the insulating arrangement for the shoulder member shown in FIG. 2B may be applied to the embodiment shown in FIG. 3B.

The invention claimed is:

1. A bonding device for joining together a first member, an intermediate member, and a second member which are electroconductive, extend along a prescribed major plane, and are layered in this order as a laminated assembly, comprising:

an anvil configured to support a first surface of the laminated assembly provided by the first member, and including an electroconductive part abutting against the first surface;

a probe configured to rotate around a central axial line crossing the major plane and move toward and away from a second surface of the laminated assembly provided by the second member at a position corresponding to the anvil, the probe being at least partly electroconductive and having a tip end;

a drive mechanism configured to rotate the probe around the central axial line and move the probe toward and away from the second member along the central axial line;

an electric power supply electrically connected to the anvil and the probe to conduct electric current through the laminated assembly via the anvil and the probe; and a control unit for controlling operation of the drive mechanism and the electric power supply, the control unit configured to:

control the drive mechanism to push the probe into the laminated assembly from the second surface while rotating the probe around the central axial line;

monitor a position of the tip end of the probe along the central axial line;

control the electric power supply to initiate conduction of electric current between the probe and the anvil once the tip end of the probe reaches the intermediate member; and then control the drive mechanism to pull the probe away from the laminated assembly, thereby the first member and the intermediate member are joined to each other by resistance welding and the second member and the intermediate member are joined to each other by friction stir bonding.

2. The bonding device according to claim 1, further comprising a shoulder member having a shoulder contact surface configured to be pressed against the second surface, a thorough hole configured to receive the probe, and a recess recessed relative to the shoulder contact surface so as to define a bottom surface opposing the second surface and partly receive the probe, wherein the recess is configured to receive a portion of the second member that is pushed away by the probe and left on the laminated assembly when the probe is plunged into the laminated assembly.

3. The bonding device according to claim 2, wherein the shoulder member is at least partly electroconductive, and the probe is provided with a probe conductive part extending from a part electrically connected to the power supply to the tip end of the probe opposing the second surface, and a probe insulating part provided on an outer periphery of the probe so as to electrically insulate the probe conductive part from an inner circumferential surface of the through hole.

4. The bonding device according to claim 2, wherein the shoulder member is partly electroconductive, and is provided with a shoulder member insulating part extending over the shoulder contact surface and an inner peripheral surface of the through hole so as to prevent electric current from flowing from the probe to the shoulder member.

5. The bonding device according to claim 2, wherein the friction stir welding is a friction stir spot welding, and the shoulder contact surface has an annular shape centered around the probe.

6. The bonding device according to claim 2, wherein the friction stir welding is a friction stir line welding, and the recess is open in a rear side thereof with respect to a traveling direction of the shoulder member relative to the laminated assembly at time of the friction stir line welding.

* * * * *